US011537637B2

(12) United States Patent
Malik et al.

(10) Patent No.: US 11,537,637 B2
(45) Date of Patent: Dec. 27, 2022

(54) DATA CLUSTERING

(71) Applicant: FUJITSU LIMITED, Kawasaki (JP)

(72) Inventors: Osman Asif Malik, Boulder, CO (US); Hayato Ushijima, San Jose, CA (US); Avradip Mandal, San Jose, CA (US); Indradeep Ghosh, Cupertino, CA (US); Arnab Roy, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 17/018,926

(22) Filed: Sep. 11, 2020

(65) Prior Publication Data

US 2022/0083567 A1 Mar. 17, 2022

(51) Int. Cl.
  *G06F 16/00* (2019.01)
  *G06F 16/28* (2019.01)
  *G06F 17/16* (2006.01)

(52) U.S. Cl.
  CPC ............ *G06F 16/285* (2019.01); *G06F 17/16* (2013.01)

(58) Field of Classification Search
  CPC ....................................... G06F 17/16
  USPC ......................................... 707/737
  See application file for complete search history.

(56) References Cited

U.S. PATENT DOCUMENTS 10,592,816 B1   3/2020 Hsu et al.
2020/0074220 A1* 3/2020 Zhang ................. G06K 9/6218
                                        707/707

FOREIGN PATENT DOCUMENTS

WO   2019244105 A1   12/2019

OTHER PUBLICATIONS

European Search Report dated Feb. 3, 2022 as received in application No. 21190749.8.
"Quadratic unstrained binary optimization" Wikipedia, Apr. 2, 2020.
Daniel O'Malley and Velimir V. Vesselinov. ToQ.jl: A high-level programming language for D-Wave machines based on Julia. In 2016 IEEE High Performance Extreme Computing Conference (HPEC), pp. 1-7. IEEE, 2016.
Daniel O'Malley, Velimir V. Vesselinov, Boian S. Alexandrov, and Ludmil B. Alexandrov. Nonnegative/binary matrix factorization with a d-wave quantum annealer. PloS one, 13(12):e0206653, 2018.

(Continued)

*Primary Examiner* — Alexandria Y Bromell
(74) *Attorney, Agent, or Firm* — Maschoff Brennan

(57) ABSTRACT

A method may include obtaining a first matrix that represents data in a data set and obtaining a number of clusters into which the data is to be grouped. The method may further include constructing a second matrix using the first matrix and the number of clusters. The second matrix may represent a formulation of a first optimization problem in a framework of a second optimization problem. The method may further include solving the second optimization problem using the second matrix to generate a solution of the second optimization problem and mapping the solution of the second optimization problem into a first solution matrix that represents a solution of the first optimization problem. The method may further include grouping the data into multiple data clusters using the first solution matrix. A number of the multiple data clusters may be equal to the number of clusters.

20 Claims, 6 Drawing Sheets

(56) References Cited

OTHER PUBLICATIONS

Daniele Ottaviani and Alfonso Amendola. Low rank non-negative matrix factorization with d-wave 2000q. arXiv preprint arXiv:1808.08721, 2018.
Ajinkya Bode, Vincent E. Elfving, and Samuel J. Lomonaco. Quantum Approximate Optimization for Hard Problems in Linear Algebra. arXiv preprint arXiv:2006.15438, Jun. 27, 2020.
Cheng, Yizong, and George M. Church. "Biclustering of expression data." Ismb. vol. 8. No. 2000. 2000.
Ihmels, Jan, et al. "Revealing modular organization in the yeast transcriptional network." Nature genetics 31.4 (2002): 370-377.
Tanay, Amos, Roded Sharan, and Ron Shamir. "Discovering statistically significant biclusters in gene expression data." Bioinformatics 18.suppl_1 (2002): S136-S144.
Tanay, Amos, et al. "Revealing modularity and organization in the yeast molecular network by integrated analysis of highly heterogeneous genomewide data." Proceedings of the National Academy of Sciences 101.9 (2004): 2981-2986.
Sharan, Roded, Adi Maron-Katz, and Ron Shamir. "Click and Expander: a system for clustering and visualizing gene expression data." Bioinformatics 19.14 (2003): 1787-1799.
Ihmels, Jan, Sven Bergmann, and Naama Barkai. "Defining transcription modules using large-scale gene expression data." Bioinformatics 20.13 (2004): 1993-2003.
Prelić, Amela, et al. "A systematic comparison and evaluation of biclustering methods for gene expression data." Bioinformatics 22.9 (2006): 1122-1129.
Mehmet Koyutürk and Ananth Grama. Proximus: A framework for analyzing very high dimensional discrete-attributed datasets. In Proceedings of the Ninth ACM SIGKDD International Conference on Knowledge Discovery and Data Mining, pp. 147-156, 2003.
Zhongyuan Zhang, Tao Li, Chris Ding, and Xiangsun Zhang. Binary matrix factorization with applications. In Seventh IEEE International Conference on Data Mining (ICDM 2007), pp. 391-400. IEEE, 2007.
Pauli Miettinen, Taneli Mielikäinen, Aristides Gionis, Gautam Das, and Heikki Mannila. The discrete basis problem. IEEE transactions on knowledge and data engineering, 20(10):1348-1362, 2008.
Bao-Hong Shen, Shuiwang Ji, and Jieping Ye. Mining discrete patterns via binary matrix factorization. In Proceedings of the 15th ACM SIGKDD International Conference on Knowledge Discovery and Data Mining, pp. 757-766, 2009.
Zhong-Yuan Zhang, Tao Li, Chris Ding, Xian-Wen Ren, and Xiang-Sun Zhang. Binary matrix factorization for analyzing gene expression data. Data Mining and Knowledge Discovery, 20(1):28, 2010.
Claudio Lucchese, Salvatore Orlando, and Raffaele Perego. Mining top-k patterns from binary datasets in presence of noise. In Proceedings of the 2010 SIAM International Conference on Data Mining, pp. 165-176. SIAM, 2010.
Pauli Miettinen and Jilles Vreeken. Model order selection for boolean matrix factorization. In Proceedings of the 17th ACM SIGKDD International Conference on Knowledge Discovery and Data Mining, pp. 51-59, 2011.
Eduard Bartl, Radim Belohlavek, Petr Osicka, and Hana Rezankova. Dimensionality reduction in boolean data Comparison of four bmf methods. In International Workshop on Clustering High-Dimensional Data, pp. 118-133. Springer, 2012.
Siamak Ravanbakhsh, Barnabás Póczos, and Russell Greiner. Boolean Matrix Factorization and Noisy Completion via Message Passing. In ICML, vol. 69, pp. 945-954, 2016.
Ignacio Ramirez. Binary matrix factorization via dictionary learning. IEEE journal of selected topics in signal processing, 12(6):1253-1262, 2018.
Ravi Kumar, Rina Panigrahy, Ali Rahimi, and David Woodruff. Faster algorithms for binary matrix factorization. In International Conference on Machine Learning, pp. 3551-3559, Jun. 19, 2019.
Lifan Liang, Kunju Zhu, and Songjian Lu. BEM: Mining Coregulation Patterns in Transcriptomics via Boolean Matrix Factorization. Bioinformatics, Jan. 8, 2020.

\* cited by examiner

FIG. 2

DATA CLUSTERING

The embodiments discussed in the present disclosure are related to clustering of data.

BACKGROUND

Data may be grouped into data clusters. Clustered data may be used for statistical data analysis in many fields. For example, the fields that may use data clusters may include pattern recognition, image analysis, information retrieval, bioinformatics, data compression, computer graphics, and machine learning, among others.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a method may include obtaining a first matrix that represents data in a data set and obtaining a number of clusters into which the data is to be grouped. The method may further include constructing a second matrix using the first matrix and the number of clusters. In some embodiments, the second matrix may represent a formulation of a first optimization problem in a framework of a second optimization problem. The method may further include solving the second optimization problem using the second matrix to generate a solution of the second optimization problem and mapping the solution of the second optimization problem into a first solution matrix that represents a solution of the first optimization problem. The method may further include grouping the data into multiple data clusters using the first solution matrix. In some embodiments, a number of the multiple data clusters may be equal to the number of clusters.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 2 illustrates example matrices that may be used to cluster data;

DESCRIPTION OF EMBODIMENTS

With advancements in technology, large amounts of data may be collected and stored. Information may be obtained from the data. In some instances, information may be obtained from the data by grouping the data into data clusters. For example, data may be grouped based on similar characteristics.

In some instances, data may be represented in matrix form. The data may be grouped into data clusters in matrix form by grouping the rows and/or columns of the matrix. For example, data may be collected from multiple individuals regarding their genes. The information may be arranged in a matrix. The individuals may be grouped into clusters based on their genes to identify which of the individuals may be more susceptible to certain diseases such as cancer.

In some instances, grouping data in a matrix into data clusters may be performed using binary matrix factorization (BMF). A factorization of a matrix represents the matrix as a product of two or more matrices. The factorization may be performed using an integer that may define the size of the two or matrices resulting from the factorization. For example, a m×n matrix A may be factored using an integer k into a m×k matrix B and a k×n matrix C. BMF may be performed to minimize a difference between the matrix A and the product of the matrix B and the matrix C. When performing BMF on a matrix to group data in the matrix, the integer k may represent a number of the data clusters to be determined.

In some instances, BMF may be a combinatorial optimization problem that may be difficult to solve. However, solutions for combinatorial optimization problems in the form of quadratic unconstrained binary optimization (QUBO) problems may be obtained using hardware that uses the concepts of quantum physics to obtain solutions. For example, a digital annealer or other quantum computing technologies may be used to obtain solutions for QUBO problems.

Some embodiments in this disclosure relate to systems and/or methods that may be configured to arrange data into a binary matrix form for BMF so that the data may be grouped into data clusters. In these and other embodiments, a QUBO problem formulation may be obtained that estimates the BMF of the binary matrix. The QUBO problem formulation may include one or more constraints regarding how the data in the binary matrix is grouped into the data clusters. The QUBO problem may be solved using a digital annealer or quantum computing technologies. The solution of the QUBO problem may be mapped to two matrices that may represent a solution to the BMF of the binary matrix. Using the two matrices, the data from the binary matrix may be grouped into data clusters.

Figure 1:
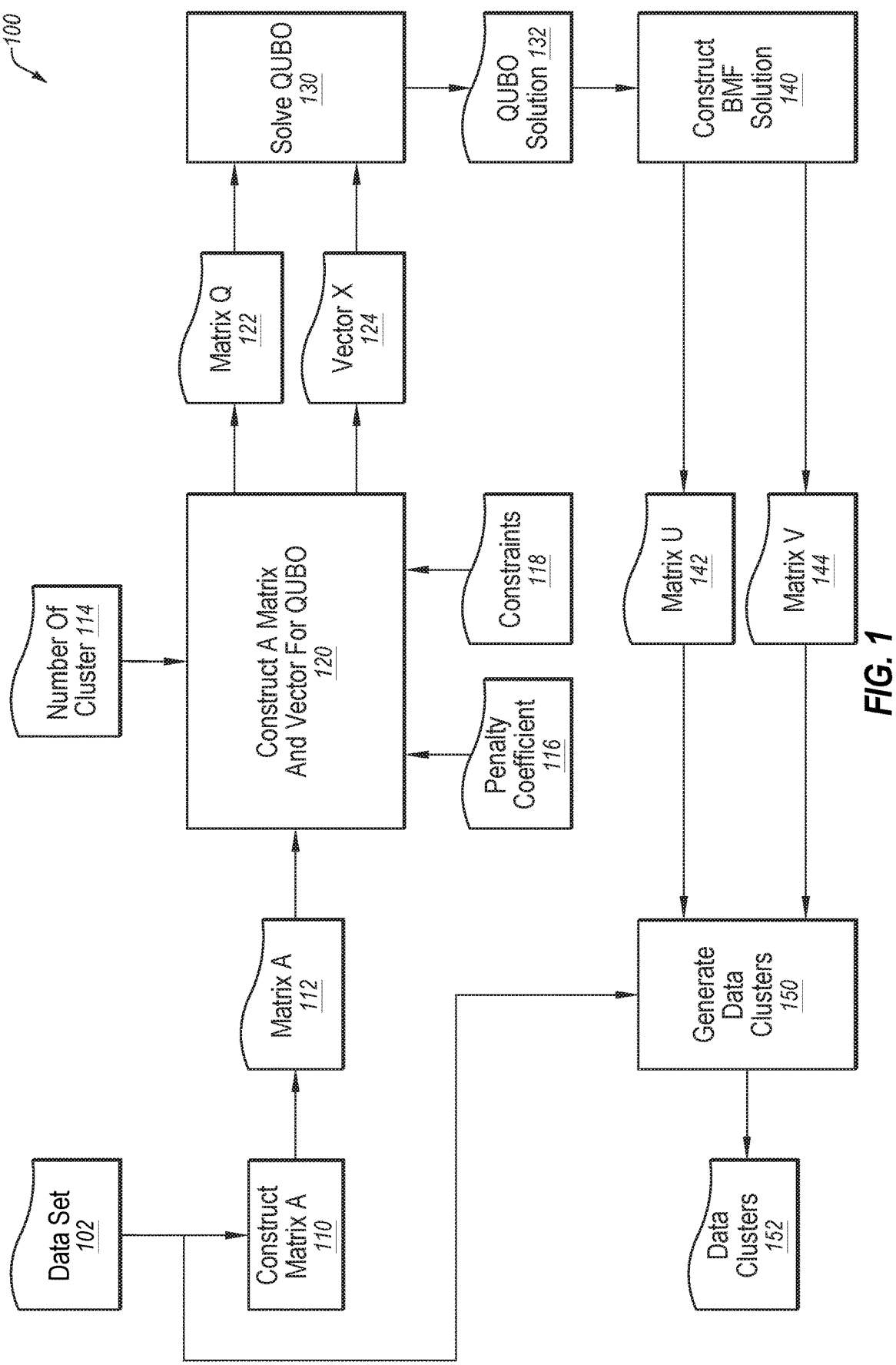
FIG. 1 illustrates an example operational flow for data clustering.

FIG. 1 illustrates an example operational flow 100, according to at least one embodiment in the present disclosure. The operational flow 100 may illustrate an operational flow for grouping data into data clusters. For example, the operational flow 100 may include multiple operations that may be configured to group data from a data set 102 into data clusters 152. As an example, a first subset of the data may be grouped together in a first data cluster of the data clusters 152, a second subset of the data may be grouped together in a second data cluster of the data clusters 152, and a third subset of the data may be grouped together in a third data cluster of the data clusters 152.

Figure 2:
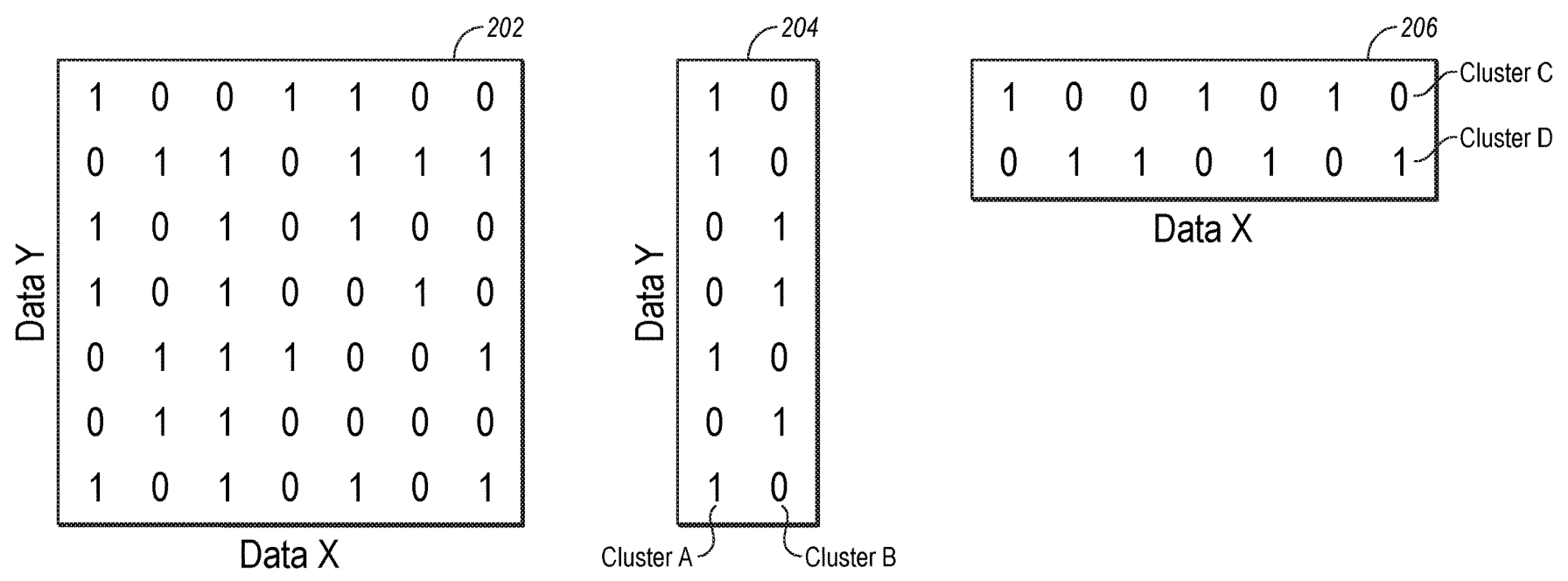

In some embodiments, at operation 110 a matrix A 112 may be constructed using the data set 102. The matrix A may be constructed as a binary matrix. A binary matrix may be a matrix where all of the entries in the matrix have a value of one or zero. A matrix 202 illustrated in FIG. 2, is an example of a binary matrix.

In some embodiments, the data set 102 may not be in the form of a matrix. In these and other embodiments, data from the data set 102 may be reshaped into a matrix. The data may be reshaped into a matrix by determining first variables in the data set 102 that may be represented in the rows of the matrix and second variables in the data set 102 that may be represented in the columns of the matrix. For example, the data set 102 may include information regarding the genes of individuals. In these and other embodiments, the genes may be represented by the rows and the columns may be represented by the individuals. As another example, the data set 102 may include information regarding on-line purchases made by individuals at a store. All of the items purchased by the users may be represented by the rows and the individuals may be represented by the columns. A number at a matrix location may represent a number of items purchased by a user. A zero at a matrix location may indicate that a user has not purchased an item.

In some embodiments, data in the matrix may not be in binary form. In these and other embodiments, the matrix may be formed into a binary matrix. For example, the matrix may be formed into a binary matrix using a thresholding technique. In these and other embodiments, a threshold value may be selected based on the values in the matrix. In response to values in the matrix being less than the threshold, the values may be changed to the number zero in the binary matrix. In response to the values in the matrix being greater than the threshold, the values may be changed to the number one in the binary matrix.

In some embodiments, a dimension of a matrix may be adjusted by the operation 110. In these and other embodiments, a number of columns and/or rows of the matrix may be adjusted. In these and other embodiments, the columns and/or rows of the matrix may be adjusted before the matrix is formed into a binary matrix when the matrix is not already a binary matrix.

In some embodiments, the number of columns and/or rows of the matrix may be adjusted based on capabilities of the hardware that may be used to solve or find solutions for the QUBO problem in operation 130. For example, in response to a number of columns and/or rows being larger than a threshold number based on the capabilities of the hardware that may be used to solve or find solutions for the QUBO problem, the number of columns and/or rows may be reduced.

Alternately or additionally, the number of columns and/or rows of the matrix may be adjusted in response to the matrix being size m×n where m is approximately equal to n. In these and other embodiments, the number of columns and/or rows of the matrix may be adjusted such that m>>n and n is a number that is less than 300, 500, 700, 1000, 1500, 2000, 3000, 5000, 10,000 or some other value within the range of 2 to 15,000. Alternately or additionally, the number of columns and/or rows of the matrix may be adjusted such that n>>m and m is a number that is less than 300, 500, 700, 1000, 1500, 2000, 3000, 5000, 10,000 or some other value within the range of 2 to 15,000.

In some embodiments, the number of columns and/or rows of the matrix may be adjusted by compressing the data in the matrix. The data in the matrix may be compressed by sampling of the data in the matrix. The sampled data may be used as the data in the matrix and the non-sampled data may be removed. In these and other embodiments, a sampling may be performed based on leverage scores of the matrix. The leverage score of the matrix may determine an importance of specific data in the matrix in relation to other data in the matrix. The importance may be based on a statistical analysis of the data in the matrix.

In some embodiments, the matrix determined by the operation 110 may be referred to as the matrix A 112. The matrix A 112 may be provided to the operation 120. In some embodiments, the matrix A 112 may be the matrix for which BMF may be performed to group the data from the data set 102 represented in the matrix A 112 into the data clusters 152.

In some embodiments, the number of the data clusters 152 into which the data represented in the matrix A 112 may be grouped may be determined based on data and the information to be determined from the data. For example, when the data concerns individuals and a health condition, the individuals may be grouped into two groups, a first group that has the health condition and a second group that does not have the health condition. As a result, a number of the data clusters 152 may be two. In other examples, the number of data clusters 152 may be 2, 3, 4, 6, 8, 10, 12, 15, 20, or some other number of the data clusters 152. In these and other embodiments, the number of the data clusters 152 may be less than the smaller of the number of rows and number of columns of the matrix A 112. In some embodiments, the number of the data clusters 152 may be provided to the operation 120 as the number of clusters 114.

Based on the number of clusters 114 and the matrix A 112, the BMF for the matrix A 112 may be defined as follows: where $A \in \{0,1\}^{m \times n}$ is a matrix with binary entries and r is the number of clusters 114 where r is a positive integer and r≤min(m, n), the binary matrix factorization (BMF) problem may be defined as follow:

$$\min_{U,V} \|A - UV^T\|_F^2$$

$$\text{s.t. } U \in \{0,1\}^{m \times r}, V \in \{0,1\}^{n \times r}$$

and U is referred to as matrix U 142 and V is referred to as matrix V 144.

In some embodiments, at operation 120 a matrix Q 122 and a vector X 124 may be constructed for a QUBO problem that is a formulation of the BMF problem of the matrix A 112. In these and other embodiments, the QUBO problem being a formulation of the BMF problem may indicate that the QUBO problem is constructed using variables based on the matrix A 112 and the number of clusters 114 such that the QUBO problem generates a solution that is an approximate solution to the BMF problem.

In some embodiments, a QUBO problem may be defined as:

$$\min_x x^T Q x \text{ where } x \in \{0,1\}^n \text{ and } Q \in \mathbb{R}^{n \times n}$$

where n is any real number. Based on the above definition, the matrix Q 122 and the vector X 124 may be constructed using the matrix A 112 and the number of clusters 114 such that the QUBO is a formulation of the BMF of the matrix A 112.

To create a QUBO that is a formulation of the BMF of the matrix A 112, the BMF may be reformulated to the form of the QUBO. To reformulate the BMF to the form of the QUBO, the equation for the BMF is reformulated by introducing additional variables while seeking to maintain the BMF. For example, the equation for the BMF may be re-written as follows:

$$\|A - UV^T\|_F^2 = \|A\|_F^2 - 2\sum_{ijk} \alpha_{ij} U_{ij} V_{ij} + \sum_{ijkk'} U_{ik} U_{ik'} V_{jk} V_{jk'},$$

where the summations are over $i \in [m]$, $j \in [n]$, and $k, k' \in [r]$.

The third term on the right hand side of the above equation, namely, $\Sigma_{ijkk'} U_{ik}U_{ik'}V_{jk}V_{jk'}$, may not be in the form of a QUBO based on the third term being of a higher order than two. As such, ancillary variables $\tilde{U}$ and $\tilde{V}$ may be introduced into the equation to reformulate the BMF into the QUBO. The ancillary variables may be defined as follow:

$$\tilde{u}_{i(kk')} \stackrel{\text{def}}{=} u_{ik}u_{ik'}, \text{ for } i \in [m], k, k' \in [r],$$

$$\tilde{v}_{j(kk')} \stackrel{\text{def}}{=} v_{jk}v_{jk'}, \text{ for } j \in [n], k, k' \in [r].$$

where $\tilde{U}=(\tilde{u}_{i(kk')})$ and $\tilde{V}=(\tilde{v}_{j(kk')})$ and $\tilde{U}$ is a matrix of size $m \times r^2$ and $\tilde{V}$ is a matrix of size $n \times r^2$. With the ancillary variables $\tilde{U}$ and $\tilde{V}$, the BMF equation may be described as follows:

$$\min_{U,V,\tilde{U},\tilde{V}} \|A\|_F^2 - 2\sum_{ijk} \alpha_{ij} U_{ik} V_{jk} + \sum_{ijkk'} \tilde{u}_{i(kk')} \tilde{v}_{j(kk')}$$

$$\text{s.t. } U \in \{0,1\}^{m \times r}, V \in \{0,1\}^{n \times r}$$

To incorporate the constraints of the ancillary variables $\tilde{U}$ and $\tilde{V}$ as defined above, the QUBO formulation may be adjusted to include a penalty. The penalty may express the constraints of the ancillary variables $\tilde{U}$ and $\tilde{V}$. The penalty may be included by incorporating a penalty function into the QUBO formulation. Given the matrix A 112 is a binary matrix, the penalty function may be expressed as a penalty coefficient 116. Thus, the BMF equation may be described as follows:

$$\min_{U,V,\tilde{U},\tilde{V}} \|A\|_F^2 - 2\sum_{ijk} \alpha_{ij} U_{ik} V_{jk} + \sum_{ijkk'} \tilde{u}_{i(kk')} \tilde{v}_{j(kk')} +$$

$$\lambda \sum_{ikk'} f(\tilde{u}_{i(kk')}, U_{ik}, U_{ik'}) + \lambda \sum_{jkk'} f(\tilde{v}_{j(kk')}, V_{jk}, V_{jk'})$$

$$\text{s.t. } U \in \{0,1\}^{m \times r}, V \in \{0,1\}^{n \times r}, \tilde{u} \in \{0,1\}^{m \times r^2}, \tilde{V} \in \{0,1\}^{n \times r^2}.$$

where $\lambda$ is the penalty coefficient 116.

The penalty coefficient 116 may be selected randomly for use in the QUBO problem. In some embodiments, the penalty coefficient 116 may be selected to be larger than (m*n)+1, where m is the number of rows of the matrix Q 122 and n is the number of columns of the matrix Q 122. Alternately or additionally, in response to the construction of the matrix A 112 including compression of the matrix that include the data of the data set 102, the penalty coefficient 116 may be adjusted. For example, the penalty coefficient 116 may be selected to be larger than (s*n)+1, where n is the number of columns of the matrix Q 122 and s is the number of rows that are sampled during the compression of the matrix to form the matrix A 112. Thus, the penalty coefficient may be adjusted in response to the matrix A 112 being formed using compression of a matrix that includes the data of the data set 102.

Given the above, the matrix Q 122 and the vector X 124 of the QUBO problem may be defined. For example, the vector X 124 may be defined as follows:

$$x \stackrel{\text{def}}{=} [u; v; \tilde{u}; \tilde{v}]$$

where $u \stackrel{\text{def}}{=} \text{vec}(U), v \stackrel{\text{def}}{=} \text{vec}(V), \tilde{u} \stackrel{\text{def}}{=} \text{vec}(\tilde{U})$ and $\tilde{v} \stackrel{\text{def}}{=} \text{vec}(\tilde{V})$, The matrix Q 122 may be defined as follows:

$$Q \stackrel{\text{def}}{=} \begin{bmatrix} Q^{(1)} & Q^{(2)} \\ 0 & Q^{(3)} \end{bmatrix} \in$$

$$\mathbb{R}^{(m+n)(r+r^2) \times (m+n)(r+r^2)} \text{ where } Q^{(1)} \stackrel{\text{def}}{=} \begin{bmatrix} \lambda 1_r \otimes I_m & -2I_r \otimes A \\ 0_{nr \times mr} & \lambda 1_r \otimes I_n \end{bmatrix},$$

$$Q^{(2)} \stackrel{\text{def}}{=} -2\lambda \begin{bmatrix} 1_{1 \times r} \otimes I_{mr} & 0_{mr \times nr^2} \\ 0_{nr \times mr^2} & 1_{1 \times r} \otimes I_{nr} \end{bmatrix} - 2\lambda \begin{bmatrix} I_r \otimes 1_{1 \times r} \otimes I_m & 0_{mr \times nr^2} \\ 0_{nr \times mr^2} & I_r \otimes 1_{1 \times r} \otimes I_n \end{bmatrix},$$

$$\text{and } Q^{(3)} \stackrel{\text{def}}{=} \begin{bmatrix} 3\lambda I_{mr^2} & I_{r^2} \otimes 1_{m \times n} \\ 0_{nr^2 \times mr^2} & 3\lambda I_{nr^2} \end{bmatrix}$$

where I is an identity matrix.

In some embodiments, different ancillary variables may be introduced into the equation to reformulate the BMF into the QUBO. In these and other embodiments, the matrix Q 122 may be defined as follow:

$$Q \stackrel{\text{def}}{=} \begin{bmatrix} P^{(1)} & P^{(2)} \\ 0 & P^{(3)} \end{bmatrix} \in \mathbb{R}^{(m+n+mn)r \times (m+n+mn)r},$$

$$\text{where } P^{(1)} \stackrel{\text{def}}{=} \frac{\lambda}{2} \begin{bmatrix} 0_{mr} & I_r \otimes 1_{m \times n} \\ I_r \otimes 1_{n \times m} & 0_{nr} \end{bmatrix}, P^{(2)} \stackrel{\text{def}}{=} -2\lambda \begin{bmatrix} I_r \otimes 1_{1 \times n} \otimes I_m \\ I_{nr} \otimes 1_{1 \times m} \end{bmatrix},$$

$$\text{and } P^{(3)} \stackrel{\text{def}}{=} 1_r \otimes I_{mn} - 2\text{diag}((1_{r \times 1} \otimes I_{mn})\text{vec}(A)) + 3\lambda I_{mnr}$$

where I is an identity matrix.

In some embodiments, one or more constraints 118 may be used based on how the data from the data set 102 may be grouped into the data clusters 152. For example, a constraint may include that data may be grouped into only a particular number of the data clusters 152. For example, a constraint may indicate that the data may be grouped into only one of three data clusters 152. As another example, the data may be grouped into only two of five data clusters 152. As another example, a constraint may include that data is to be grouped into a particular number of data clusters 152. For example, the data may be grouped such that all of the data is grouped into two groups or at least two groups. As another example, a constraint may include that particular data may not be grouped with other data. Other types of constraints may also be considered.

In some embodiments, the constraints 118 may be provided to the operation 120. In these and other embodiments, the matrix Q 122 may be adjusted based on the constraint. For example, assume that the constraint 118 is that the data is to be grouped into only one group among the columns of the matrix A 112. This may be characterized by the following expression for the BMF:

$$\sum_k V_{jk} = 1 \text{ for all } j.$$

This expression may indicate that number of nonzero elements that may be included in each column of the first solution matrix is equal to one. Alternately or additionally, an additional constraint 118 may be that is the data is to be grouped into only group among the rows of the matrix A 112. This may be characterized by the following expression for the BMF:

$$\sum_k U_{jk} = 1 \text{ for all } j.$$

To formulate the QUBO based on the BMF characterization for one constraint, a matrix may be defined as follows:

$$C \stackrel{def}{=} \begin{bmatrix} 0 & 0 \\ 0 & \lambda(1_r \otimes I_n - 2I_{nr}) \end{bmatrix}$$

The matrix C may be incorporated into the matrix Q 122 as follows:

$$Q^\square \stackrel{def}{=} \begin{bmatrix} Q^{(1)} + C & Q^{(2)} \\ 0 & Q^{(3)} \end{bmatrix}$$

Thus, the matrix Q 122 may be adjusted to include a constraint regarding the grouping of the data from the data set 102 into the data clusters 152. Additional constraints may be added to the matrix Q 122 in a similar manner based on the particular manner in which the data may be grouped into the data clusters 152.

In some embodiments, at operation 130 a solution 132 for the QUBO problem represented by the matrix Q 122 and the vector X 124 may be generated. A solution may be generated by providing the QUBO problem to a quantum processing system, a digital annealing system, or some other system configured to solve QUBO problems. The solution 132 may be in the form of a binary vector. The locations in the vector may correspond to different locations in the matrix U 142 and the matrix V 144. The values at the locations in the vector may be a zero or a one. In some embodiments, the solution of the QUBO problem may be a solution generated after a particular amount of time or when a solution is within a particular optimization target of the QUBO problem.

In some embodiments, at operation 140 the matrix U 142 and the matrix V 144 may be constructed using the solution 132. During the operation 140, values in the solution 132 may be mapped to different locations in the matrix U 142 and the matrix V 144. For example, a first location of the solution 132 may map to a first location of the matrix U 142 and a second location of the solution 132 may map to a second location of the matrix V 144. A value at the location of the solution may be placed in the corresponding location in the matrix U 142 and the matrix V 144. In these and other embodiments, the matrix U 142 and the matrix V 144 may be binary matrices.

In some embodiments, one or both of the matrix U 142 and the matrix V 144 may be refined after construction based on the solution 132. For example, the matrix U 142 may be refined while the matrix V 144 is maintained. Alternately or additionally, the matrix V 144 may be refined while the matrix U 142 is maintained. Alternately or additionally, the matrix U 142 and the matrix V 144 may be iteratively refined. For example, the matrix U 142 may be refined while the matrix V 144 is maintained. After refining the matrix U 142, the matrix V 144 may be refined while the matrix U 142 is maintained. After refining the matrix V 144, the process of refining may continue iteratively switching between refining the matrix U 142 and the matrix V 144.

In some embodiments, the refining process may continue until a particular criterion is satisfied. In some embodiments, the criterion may include a particular number of iterations. Alternately or additionally, the criterion may include when a difference between the matrix before and after a refinement process is less than a threshold. For example, in response to refining the matrix V 144, a difference between the matrix V 144 before the refinement as compared to after the refinement is less than the threshold, the criterion may be satisfied.

In some embodiments, the refining of the matrix U 142 and the matrix V 144 may be performed using a binary least square (BLS) problems. For example, a solution for the following BLS problem may be determined to refine the matrix U 142:

$$U \stackrel{def}{=} \underset{U' \in \{0,1\}^{m \times r}}{\operatorname{argmin}} \|A - U'V^T\|_F^2$$

where $V^T$ is the transpose of the matrix V 144, A is the matrix A 112, U' is the matrix U 142, and U is the refined matrix U 142. Alternately or additionally, other type of optimization algorithms may be used to refine the matrix U 142 and the matrix V 144.

In some embodiments, in response to the compression of a matrix of the data of the data set 102 to reduce the size of the matrix to generate the matrix A 112, the operational flow 100 may include refining the matrix U 142 and the matrix V 144. In these and other embodiments, refining the matrix U 142 and the matrix V 144 may assist in obtaining a decomposition of the matrix of the data of the data set 102 before compression to generate the matrix A 112.

In some embodiments, at operation 150 the data clusters 152 may be generated. The data clusters 152 may be generated using the data set 102, the matrix U 142, and the matrix V 144. In some embodiments, the matrix U 142 may include information regarding data associated with the rows of the matrix A 112. In these and other embodiments, the matrix U 142 may indicate into which of the data clusters 152 the data associated with each of the rows of the matrix A 112 may be grouped. In some embodiments, the matrix V 144 may include information regarding data associated with the columns of the matrix A 112. In these and other embodiments, the matrix V 144 may indicate into which of the data clusters 152 the data associated with each of the rows of the matrix A 112 may be grouped.

As an example, the matrix A 112 may be illustrated by the matrix 202 of FIG. 2. The matrix 202 of FIG. 2 includes data X in the columns and data Y in the rows. In some embodiments, an example of the matrix U 142 may be illustrated by a matrix 204 of FIG. 2. As illustrated, the matrix 204 includes two columns that correspond to data cluster A and data cluster B, respectively. In the matrix 204, a row including a value of one in a column indicates that the data item of data Y associated with that row is grouped with the corresponding cluster. For example, the data item of data Y associated with the first row may be grouped in data cluster A and not grouped in data cluster B.

In some embodiments, an example of the transpose of the matrix V 144 may be illustrated by the matrix 206 of FIG. 2. As illustrated, the matrix 206 includes two rows that correspond to data cluster C and data cluster D, respectively. In the matrix 206, a column including a value of one in a row indicates that the data item of data X associated with that column is grouped with the corresponding cluster. For example, the data item of data X associated with the first column may be grouped in data cluster C and not grouped in data cluster D.

Some examples of the operational flow 100 follows. In a first example, the data set 102 may be gene expression data of individuals. The genes may be arranged along rows of the matrix A 112 and the individuals may be arranged along the columns of the matrix A 112. The number of clusters 114 may be three and a constraint 118 may include that each individual is clustered into only one of three data clusters 152. The data may be converted to binary using a transformation of the real values. In these and other embodiments, the matrix V 144 may include three columns each associated with a different one of the three data clusters 152. Each of the individuals in the rows may be clustered into one of the three data clusters 152 by including a value of one in one of the columns indicating the clustered associated with each individual.

In a second example, the data set 102 may be text documents. The words of the text documents may be arranged along rows of the matrix A 112 and the documents may be arranged along the columns of the matrix A 112. The number of clusters 114 may be five and no constraint 118 may be included. The five data clusters 152 may represent topics into which the words and the documents may be clustered. The data may be converted to binary using a transformation of the real values. In these and other embodiments, the matrix V 144 may include five columns each associated with a different one of the five data clusters 152. The matrix V 144 may group the documents into the five data clusters 152 representing different topics. The matrix U 142 may include five columns each associated with a different one of the five data clusters 152. The matrix U 142 may group the words into the five data clusters 152 representing the different topics.

In a third example, the data set 102 may include shopping data. The products purchased may be arranged along rows of the matrix A 112 and the individuals making purchases may be arranged along the columns of the matrix A 112. The number of clusters 114 may be 50, 100, or more and no constraint 118 may be included. The data clusters 152 may represent products that may be purchased together. The matrix U 142 may include columns each associated with a different one of the data clusters 152. The matrix U 142 may group the products into the data clusters 152. In these and other embodiments, when an individual purchases a product in a data cluster 152 the other products in the data cluster 152 may be recommended to be purchased as well.

In a fourth example, the data set 102 may include work task preferences for a pool of workers. The tasks may be arranged along rows of the matrix A 112 and the workers may be arranged along the columns of the matrix A 112. The number of clusters 114 may be three and a constraint 118 may be included to assign each worker to only one task. The data clusters 152 may represent a task to which a worker may be assigned. In these and other embodiments, the matrix V 144 may include three columns each associated with a different one of the data clusters 152 and the matrix U 142 may include three columns each associated with a different one of the data clusters 152. The matrix U 142 and the matrix V 144 may be used together to simultaneously group the task and workers in a biclique clustering of the workers and tasks based on preferences of the workers.

Modifications, additions, or omissions may be made to the operational flow 100 without departing from the scope of the present disclosure. For example, in some embodiments, the operational flow 100 may not include the constraints 118. Alternately or additionally, the operational flow 100 may not include the operation 110. In these and other embodiments, the matrix A 112 may be obtained previously.

Figure 3:
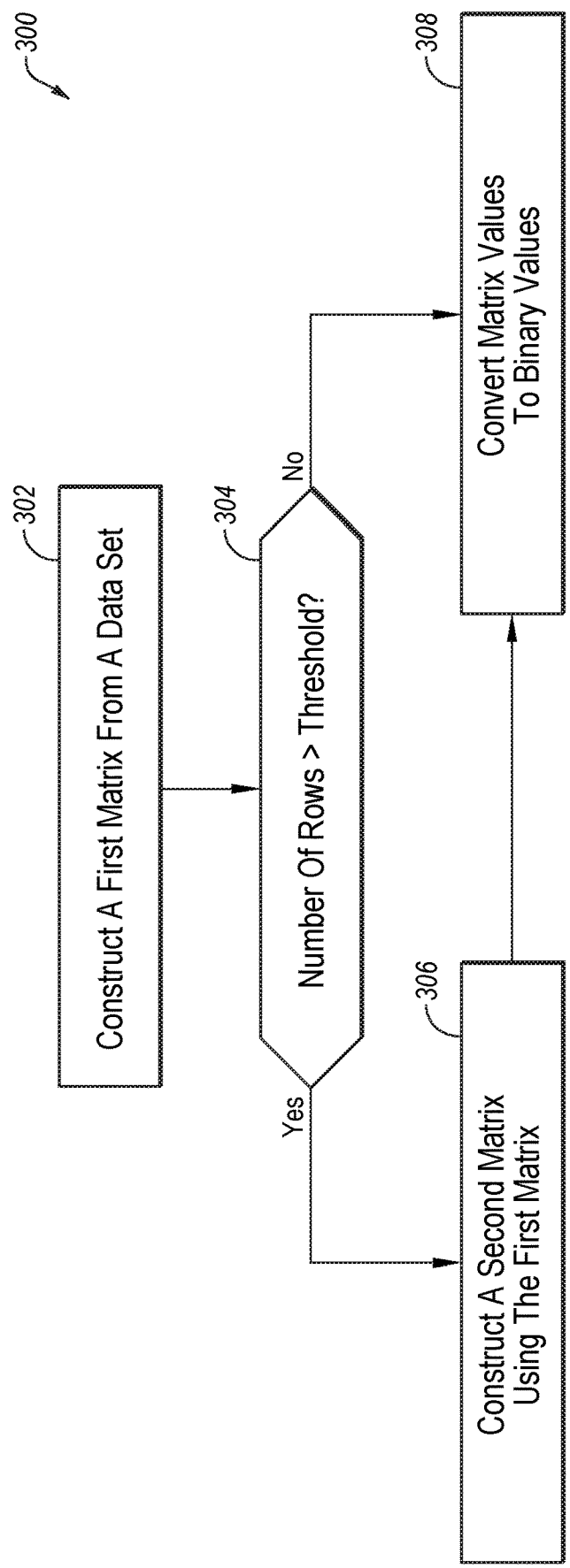
FIG. 3 illustrates a flowchart of an example method that may be used when clustering data.

FIG. 3 illustrates a flowchart of an example method that may be used when clustering data. The method 300 may be arranged in accordance with at least one embodiment described in the present disclosure. One or more operations of the method 300 may be performed, in some embodiments, by a device or system, such as the system 600 of FIG. 6 or another device, combination of devices, system, or systems, such as those systems described with respect to FIG. 1. For example, one or more operations of the method 300 may be performed during the operation 110 of FIG. 1. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 302, where a first matrix may be constructed from a data set. The first matrix may be constructed such that first elements of the data set are assigned to the rows of the first matrix and second elements of the data set are assigned to the columns of the first matrix. The values in the matrix may represent a relationship between the first elements and the second elements.

At block 304, it may be determined if the number of rows of the first matrix is greater than a threshold number of rows. In response to the number of rows being greater than the threshold, the method 300 may proceed to block 306. In response to the number of rows not being greater than the threshold, the method 300 may proceed to block 308. The threshold number of rows may be based on the processing abilities of the hardware and/or software that is solving a QUBO problem based on the data set as described in this disclosure.

At block 306, a second matrix may be constructed using the first matrix. The second matrix may be constructed by compressing the first matrix. In some embodiments, the first matrix may be compressed by sampling the first matrix and using the samples of the first matrix to construct the second matrix.

At block 308, the matrix values may be converted to binary values to create a binary matrix. One or more techniques may be used to convert the matrix values to binary values. For example, a thresholding technique may be used to convert the matrix values to binary values. In these and other embodiments, a threshold may be selected based on the matrix values. The matrix values greater than the threshold may be assigned a value of one. The matrix values equal to or less than the threshold may be assigned a value of zero. The binary matrix may be a basis for constructing a matrix and a vector for a QUBO problem.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4:
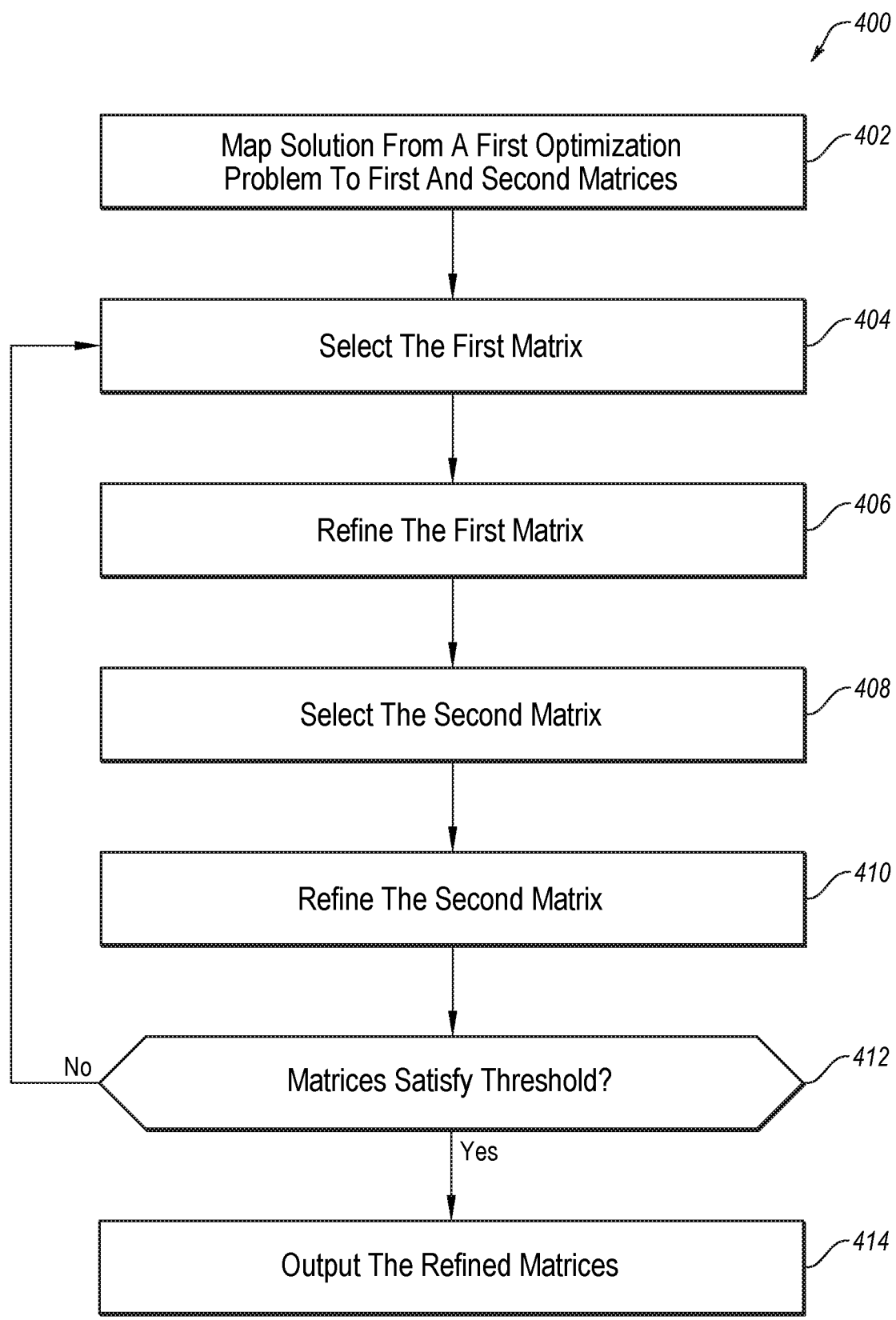
FIG. 4 illustrates a flowchart of another example method that may be used when clustering data.

FIG. 4 illustrates a flowchart of another example method 400 that may be used when clustering data. The method 400 may be arranged in accordance with at least one embodiment described in the present disclosure. One or more operations of the method 400 may be performed, in some embodiments, by a device or system, such as the system 600 of FIG. 6 or another device, combination of devices, system, or systems, such as those systems described with respect to FIG. 1. For example, one or more operations of the method 400 may be performed during the operation 140 of FIG. 1. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 402, where a solution from a first optimization problem is mapped to first and second matrices. In some embodiments, the first optimization problem may be a QUBO problem. In these and other embodiments, the first and second matrices may be a U matrix and a V matrix as described with respect to FIG. 1. The solution may be a binary vector, where each location of the vector corresponds with a location in one of the first and second matrices. The values of the vector may be used as the values in the corresponding locations of the first and second matrices. At block 404, the first matrix may be selected for refinement.

At block 406, the first matrix may be refined. While the first matrix is refined, the second matrix may remain stable. In these and other embodiments, refining the first matrix may include solving a second optimization problem with respect to the first matrix using the first matrix, the second matrix, and a matrix A that may be used when solving the first optimization problem. In some embodiments, the second optimization problem may be a BLS problem. At block 408, the second matrix may be selected.

At block 410, the second matrix may be refined. While the second matrix is refined, the first matrix may remain stable. In these and other embodiments, refining the second matrix may include solving the second optimization problem with respect to the second matrix using the second matrix, the first matrix, and the matrix A. In these and other embodiments, the first matrix used when refining the second matrix may be the first matrix before or after refinement of the first matrix.

At block 412, it may be determined if the refined matrices satisfy a threshold. The threshold may be a number of iterations of matrix refinement. Alternately or additionally, the threshold may be based on a difference between the matrices before and after refinement.

In response to the refined matrices satisfying the threshold, the method may proceed to block 414. In response to the refined matrices not satisfying the threshold, the method may return to block 404. At block 404, the first matrix may again be selected for refinement and the blocks 406 through 412 may be repeated. At block 414, the refined matrices may be output. In these and other embodiments, the refined matrices as output may be used to group data into data clusters.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Modifications, additions, or omissions may be made to FIG. 4 without departing from the scope of the present disclosure. For example, the method 400 may include determining if a refined matrix satisfies a threshold before refining the other of the first and second matrices. In these and other embodiments, after one of the matrices satisfies the threshold, the matrix may not be further refined. However, the other matrix may continue to be refined until both matrices satisfy the threshold. Alternately or additionally, the thresholds for each of the matrices may be the same or different.

Figure 5:
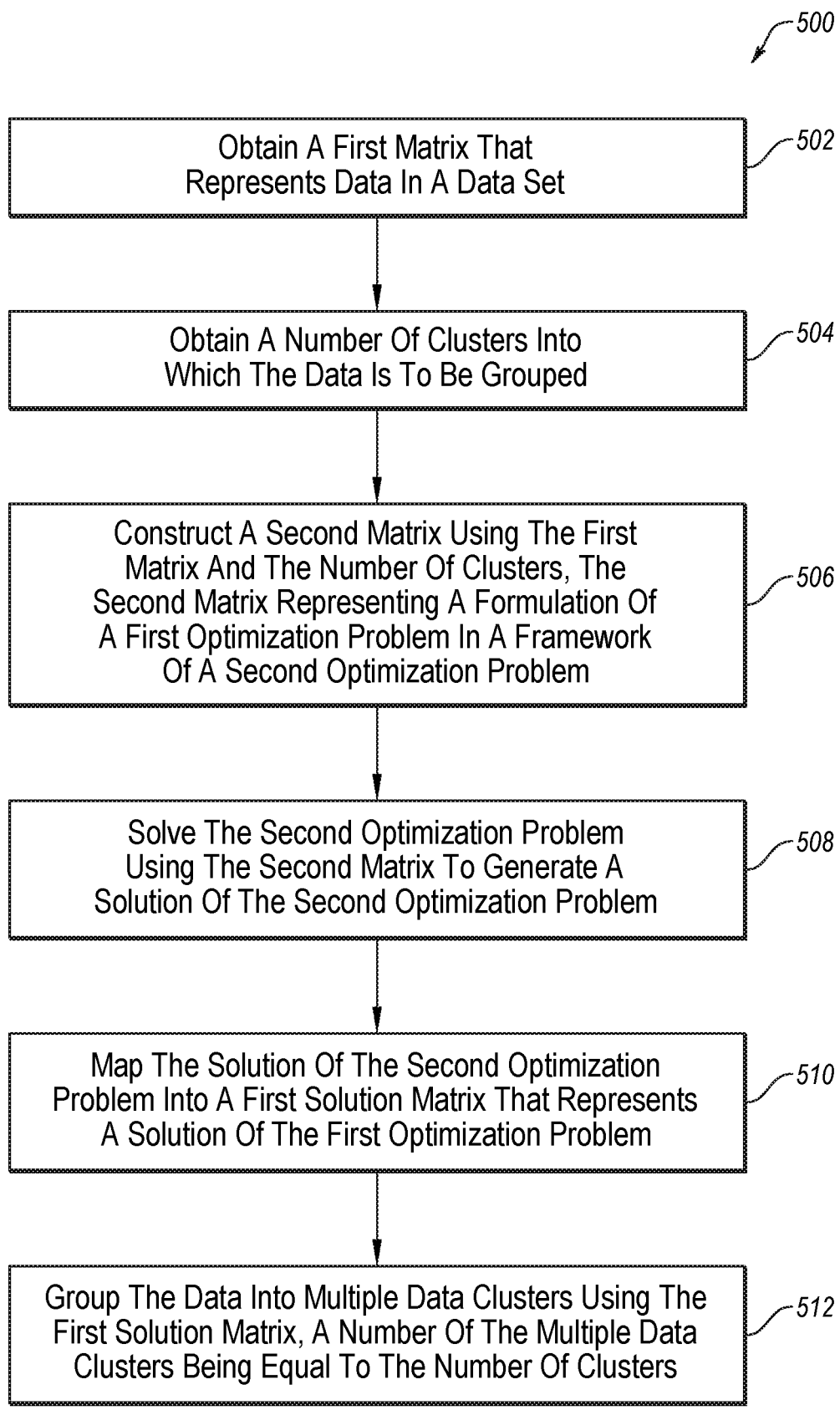
FIG. 5 illustrates a flowchart of an example method of data clustering.

FIG. 5 illustrates a flowchart of an example method 500 of data clustering. The method 500 may be arranged in accordance with at least one embodiment described in the present disclosure. One or more operations of the method 500 may be performed, in some embodiments, by a device or system, such as the system 600 of FIG. 6 or another device, combination of devices, system, or systems, such as those systems described with respect to FIG. 1. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method may begin at block 502, where a first matrix that represents data in a data set may be obtained. In some embodiments, the first matrix may be a binary matrix such that all entries in the first matrix are a one or a zero. In some embodiments, obtaining the first matrix may include constructing a third matrix using the data set. The third matrix may include a number of rows. In these and other embodiments, in response to the number of rows being greater than a threshold, the number of rows of the third matrix may be reduced to construct the first matrix based on sampling of the third matrix.

At block 504, a number of clusters into which the data is to be grouped may be obtained. At block 506, a second matrix may be constructed using the first matrix and the number of clusters. In some embodiments, the second matrix may represent a formulation of a first optimization problem in a framework of a second optimization problem. In some embodiments, the first optimization problem may be a binary matrix factorization problem and the second optimization problem may be a quadratic unconstrained binary optimization problem.

At block 508, the second optimization problem may be solved using the second matrix to generate a solution of the second optimization problem. At block 510, the solution of the second optimization problem may be mapped into a first solution matrix that represents a solution of the first optimization problem.

At block 512, the data may be grouped into multiple data clusters using the first solution matrix. In some embodiments, a number of the multiple data clusters may be equal to the number of clusters.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Modifications, additions, or omissions may be made to FIG. 5 without departing from the scope of the present disclosure. For example, the method 500 may further include mapping the solution of the second optimization problem into a second solution matrix and grouping the data into multiple second data clusters using the second solution matrix. In some embodiments, a number of the multiple second data clusters may be equal to the number of clusters. In some embodiments, the multiple data clusters group first elements represented in rows of the first matrix and the multiple second data clusters group second elements represented in columns of the first matrix.

In some embodiments, the method 500 may further include obtaining a penalty coefficient associated with formulating the first optimization problem into the framework of the second optimization problem. In some embodiments, the penalty coefficient may be greater than a number of rows of the first matrix multiplied by a number of columns of the first matrix. In these and other embodiments, the second matrix may be constructed using the first matrix, the number of clusters, and the penalty coefficient.

In some embodiments, the method 500 may further include before grouping the data into the plurality of data clusters, refining the first solution matrix by applying a binary least squares optimization to the first solution matrix.

In some embodiments, the method 500 may further include obtaining a first constraint regarding a number of nonzero elements that are included in each column or each row of the first solution matrix. In these and other embodiments, the second matrix may be constructed using the first matrix, the number of clusters, and the first constraint.

Figure 6:
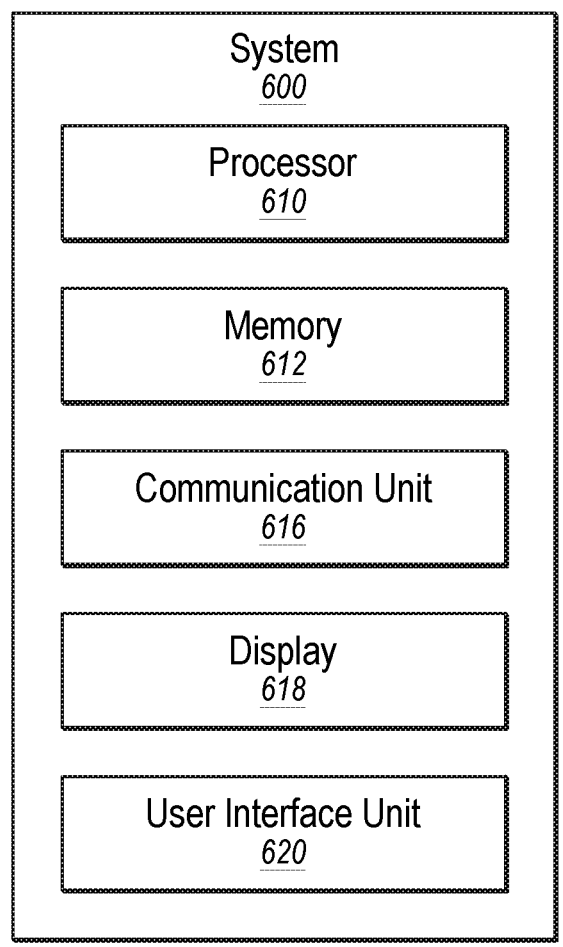
FIG. 6 illustrates an example system that may be used for data clustering.

FIG. 6 is a block diagram illustrating an example system 600 that may be used for data clustering, according to at least one embodiment of the present disclosure. The system 600 may include a processor 610, memory 612, a communication unit 616, a display 618, and a user interface unit 620, which all may be communicatively coupled. In some embodiments, the system 600 may be used to perform one or more of the methods described in this disclosure.

For example, the system 600 may be used to perform one or more of the operations in the operational flow 100 of FIG. 1.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of networks or physical locations that are configured to perform individually or collectively any number of operations described herein. In some embodiments, the processor 610 may interpret and/or execute program instructions and/or process data stored in the memory 612. In some embodiments, the processor 610 may execute the program instructions stored in the memory 612.

For example, in some embodiments, the processor 610 may execute program instructions stored in the memory 612 that are related to task execution such that the system 600 may perform or direct the performance of the operations associated therewith as directed by the instructions. In these and other embodiments, the instructions may be used to perform one or more operations of FIG. 1, one or more blocks of method 300 of FIG. 3, or one or more blocks of method 400 of FIG. 4, or one or more blocks of method 500 of FIG. 5.

The memory 612 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 610 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 616 may include any component, device, system, or combination thereof that is configured to transmit or receive information over a network. In some embodiments, the communication unit 616 may communicate with other devices at other locations, the same location, or even other components within the same system. For example, the communication unit 616 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 616 may permit data to be exchanged with a network and/or any other devices or systems described in the present disclosure.

The display 618 may be configured as one or more displays, like an LCD, LED, Braille terminal, or other type of display. The display 618 may be configured to present video, text captions, user interfaces, and other data as directed by the processor 610.

The user interface unit 620 may include any device to allow a user to interface with the system 600. For example, the user interface unit 620 may include a mouse, a track pad, a keyboard, buttons, camera, and/or a touchscreen, among other devices. The user interface unit 620 may receive input from a user and provide the input to the processor 610. In some embodiments, the user interface unit 620 and the display 618 may be combined.

Modifications, additions, or omissions may be made to the system 600 without departing from the scope of the present disclosure. For example, in some embodiments, the system 600 may include any number of other components that may not be explicitly illustrated or described. Further, depending on certain implementations, the system 600 may not include one or more of the components illustrated and described.

As indicated above, the embodiments described herein may include the use of a special purpose or general-purpose computer (e.g., the processor 610 of FIG. 6) including various computer hardware or software modules, as discussed in greater detail below. Further, as indicated above, embodiments described herein may be implemented using computer-readable media (e.g., the memory 612 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
obtaining a first matrix that represents data in a data set;
obtaining a number of clusters into which the data is to be grouped;
constructing a second matrix using the first matrix and the number of clusters, the second matrix representing a formulation of a first optimization problem in a framework of a second optimization problem, wherein the first optimization problem is a binary matrix factorization problem and the second optimization problem is a quadratic unconstrained binary optimization problem;
solving the second optimization problem using the second matrix to generate a solution of the second optimization problem;
mapping the solution of the second optimization problem into a first solution matrix that represents a solution of the first optimization problem; and
grouping the data into a plurality of data clusters using the first solution matrix, a number of the plurality of data clusters being equal to the number of clusters.

2. The method of claim 1, further comprising:
mapping the solution of the second optimization problem into a second solution matrix; and grouping the data into a plurality of second data clusters using the second solution matrix, a number of the plurality of second data clusters being equal to the number of clusters.

3. The method of claim 2, wherein the plurality of data clusters group first elements represented in rows of the first matrix and the plurality of second data clusters group second elements represented in columns of the first matrix.

4. The method of claim 1, wherein the first matrix is a binary matrix such that all entries in the first matrix are a one or a zero.

5. The method of claim 1, further comprising obtaining a penalty coefficient associated with formulating the first optimization problem into the framework of the second optimization problem, the penalty coefficient being greater than a number of rows of the first matrix multiplied by a number of columns of the first matrix, wherein the second matrix is constructed using the first matrix, the number of clusters, and the penalty coefficient.

6. The method of claim 1, wherein obtaining the first matrix includes:
constructing a third matrix using the data set, the third matrix including a number of rows; and
in response to the number of rows being greater than a threshold, reducing the number of rows of the third matrix to construct the first matrix based on sampling of the third matrix.

7. The method of claim 1, further comprising obtaining a first constraint regarding a number of nonzero elements that are included in each column or each row of the first solution matrix, wherein the second matrix is constructed using the first matrix, the number of clusters, and the first constraint.

8. The method of claim 1, further comprising before grouping the data into the plurality of data clusters, refining the first solution matrix by applying a binary least squares optimization to the first solution matrix.

9. One or more non-transitory computer-readable storage media configured to store instructions that, in response to being executed, cause a system to perform the method of claim 1.

10. A system comprising:
one or more computer-readable storage media configured to store instructions; and
one or more processors communicatively coupled to the one or more computer-readable storage media and configured to, in response to execution of the instructions, cause the system to perform operations, the operations comprising:
obtain a first matrix that represents data in a data set;
obtain a number of clusters into which the data is to be grouped;
construct a second matrix using the first matrix and the number of clusters, the second matrix representing a formulation of a first optimization problem in a framework of a second optimization problem, wherein the first optimization problem is a binary matrix factorization problem and the second optimization problem is a quadratic unconstrained binary optimization problem;
direct the second optimization problem to be solved using the second matrix to generate a solution of the second optimization problem;
map the solution of the second optimization problem into a first solution matrix that represents a solution of the first optimization problem; and group the data into a plurality of data clusters using the first solution matrix, a number of the plurality of data clusters being equal to the number of clusters.

11. The system of claim 10, wherein the operations further comprise:
map the solution of the second optimization problem into a second solution matrix; and
group the data into a plurality of second data clusters using the second solution matrix, a number of the plurality of second data clusters being equal to the number of clusters.

12. The system of claim 11, wherein the plurality of data clusters group first elements represented in rows of the first matrix and the plurality of second data clusters group second elements represented in columns of the first matrix.

13. The system of claim 10, wherein the first matrix is a binary matrix such that all entries in the first matrix are a one or a zero.

14. The system of claim 10, wherein the operations further comprise obtain a penalty coefficient associated with formulating the first optimization problem into the framework of the second optimization problem, the penalty coefficient being greater than a number of rows of the first matrix multiplied by a number of columns of the first matrix, wherein the second matrix is constructed using the first matrix, the number of clusters, and the penalty coefficient.

15. The system of claim 10, wherein obtaining the first matrix includes:
construct a third matrix using the data set, the third matrix including a number of rows; and
in response to the number of rows being greater than a threshold, reduce the number of rows of the third matrix to construct the first matrix based on sampling of the third matrix.

16. The system of claim 10, wherein the operations further comprise obtain a first constraint regarding a number of nonzero elements that are included in each column or each row of the first solution matrix, wherein the second matrix is constructed using the first matrix, the number of clusters, and the first constraint.

17. The system of claim 10, wherein the operations further comprise before grouping the data into the plurality of data clusters, refine the first solution matrix by applying an optimization to the first solution matrix.

18. The system of claim 17, wherein the optimization is a binary least squares optimization.

19. A method comprising:
obtaining a first matrix that represents data in a data set;
obtaining a number of clusters into which the data is to be grouped;
constructing a second matrix using the first matrix and the number of clusters, the second matrix representing a formulation of a first optimization problem in a framework of a second optimization problem;
solving the second optimization problem using the second matrix to generate a solution of the second optimization problem;
mapping the solution of the second optimization problem into a first solution matrix that represents a solution of the first optimization problem;
refining the first solution matrix by applying an optimization to the first solution matrix; and
after refining the first solution matrix, grouping the data into a plurality of data clusters using the first solution matrix, a number of the plurality of data clusters being equal to the number of clusters.

20. The method of claim 19, wherein the optimization is a binary least squares optimization.

\* \* \* \* \*